Sept. 13, 1932.  A. GEIBEL  1,876,907
WEED EXTRACTOR
Filed May 31, 1930
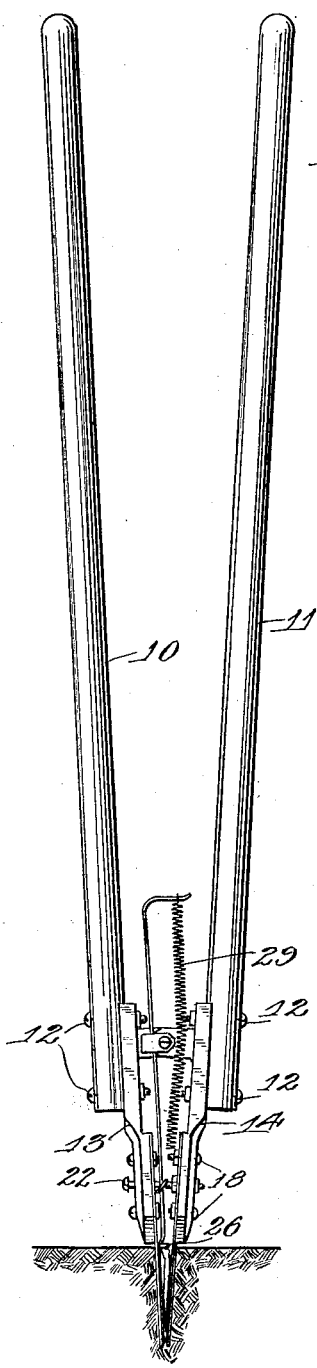
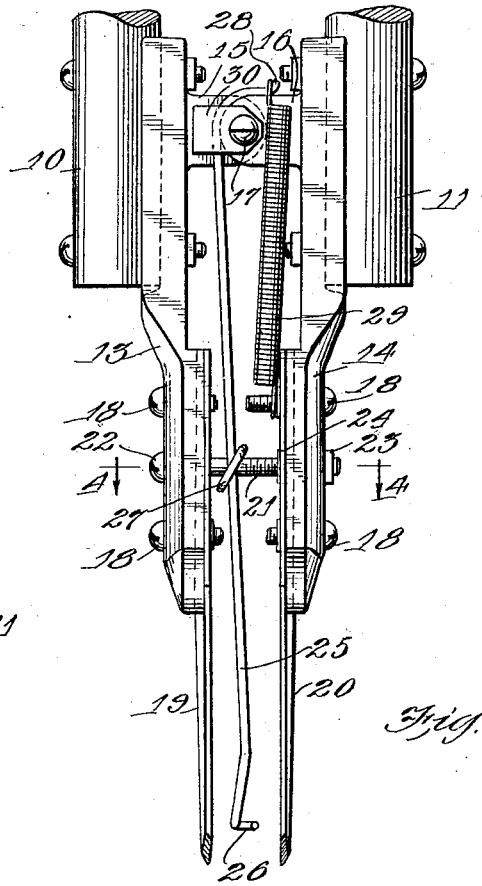
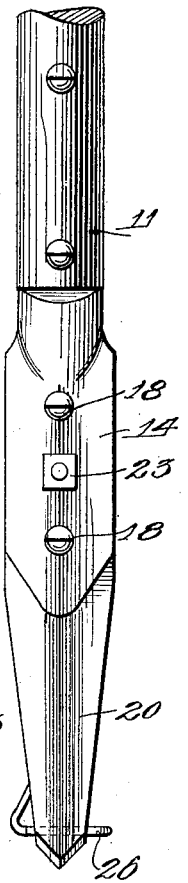
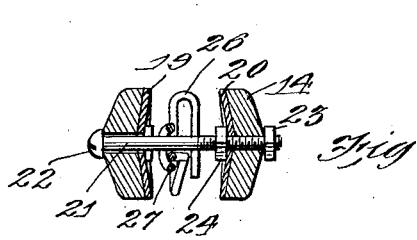
Inventor:
Andrew Geibel Patented Sept. 13, 1932

1,876,907

UNITED STATES PATENT OFFICE

ANDREW GEIBEL, OF CHICAGO, ILLINOIS

WEED EXTRACTOR

Application filed May 31, 1930. Serial No. 458,178.

This invention relates to an improved device for extracting weeds or the like although the same may be adapted for other similar uses.

The main object of this invention is to provide a device of the character described, for pulling or extracting weeds or the like, said device being adapted for operation by a person while in a substantially standing position, without stooping or getting into any other inconvenient or uncomfortable position for the purpose of operating the same.

Another object of this invention is to provide a device of the character described which will be composed of few and simple parts, which may be readily manufactured and assembled along lines convenient for low cost production, which will be durable in operation and highly efficient for carrying out the purposes for which designed.

A further object of the invention is to provide a device of the character described which may be gripped at its upper end by the hands of the operator and inserted into the ground at its opposite end, surrounding the weed or the like to be pulled out, the weed being pulled out or extracted by suitable means provided at the lower end of the device, and actuated at the gripping end thereof.

A still further object of this invention is to provide a device of the character described, with a pair of normally spaced substantially parallel blades at its one end adapted to be inserted into the ground to receive therebetween a weed or the like, said blades being movable toward each other to grip the weed around the roots thereof for pulling the same out of the ground, said blades being actuated by the handle means provided for said device.

A still further object of the invention is to provide a device of the character described, with moveable weed extracting jaws at one end, and repelling means associated with said jaws and disposed between the same for forcing the weed therefrom when the same has been pulled up or extracted.

A still further object of this invention is to provide a device of the character described with pivotally mounted weed clenching and extracting blades or jaws at one end, and repelling means associated with said jaws for forcing the weed therefrom when the same has been extracted from the ground, said means comprising a spring-actuated plunger disposed between the jaws and in position to be placed under tension when the device is inserted into the ground.

A still further object of this invention is to provide a device of the character described, having weed clenching and extracting jaws at one end and means associated therewith for forcing the weed therefrom after the same has been extracted, said jaws being actuated by the handle means of the device, and said repelling means being automatically actuated upon the removal of said jaws from the ground.

A still further object of this invention is to provide in a device of the character described, a novel and improved weed-extracting means consisting of a pair of cooperating relatively narrow gripping jaws adapted to clench the weeds to be extracted, said jaws being of such a shape and size and so disposed as to form a hole of minimum size in the ground after the weed has been extracted.

A still further object of this invention is to provide, in connection with a device of the character described, a novel and improved weed-gripping and cutting device having means associated therewith for automatically forcing out the weed after the same has been pulled up from the ground.

A still further object of this invention is to provide in a device of the character described, a novel and improved means for automatically forcing out the weed after the same has been pulled up from the ground, said means comprising a plunger mounted for vertical movement between the weed-gripping means and suitable guide means for guiding said plunger in its vertical movement.

With the foregoing and other objects in view, which will appear as the description proceeds, the invention consists in certain novel features of construction, arrangement and combination of parts, hereinafter more fully described, illustrated in the accompanying drawing and particularly pointed out in the appended claims, it being understood that various changes in the form, proportion, size and minor details of the structure may be made without departing from the spirit or sacrificing any of the advantages of the invention.

Stated generally, the invention comprises a device for extracting weeds or the like, consisting of a pair of pivotally mounted cooperating jaws or blades at one end, and handle means provided at the other end connected with said jaws for actuating the same from a standing position. Disposed between said blades or jaws is a spring actuated repelling means, said being disposed so as to be placed under tension when the device is inserted into the ground, and to be automatically released upon the removal of the device from the ground for forcing out the weed or the like from between the jaws after the same has been pulled up.

For the purpose of facilitating an understanding of my invention I have illustrated in the accompanying drawing a preferred embodiment thereof from an inspection of which when considered in connection with the following description my invention, its mode of construction and many of its advantages should be readily understood and appreciated.

Referring to the drawing in which the same characters of reference are employed to indicate corresponding or similar parts throughout the several figures of the drawing:

Fig. 1 is a front elevation view of a weed extractor embodying the present invention, the same being shown inserted into the ground;

Fig. 2 is an enlarged view showing the jaws in extended position;

Fig. 3 is a side elevational view of the same; and

Fig. 4 is a cross-sectional view taken on line 4—4 of Fig. 2.

Referring to the drawing more specifically by characters of reference, the numerals 10 and 11 designate relatively long handle members, to the normally lower ends of which are secured by means of the bolts 12, the castings 13 and 14, said castings having formed integral therewith, adjacent their upper ends, suitable bosses or ears 15 and 16 through which is adapted to pass the bolt 17 for pivotally securing said castings to each other. To the other end of said castings is rigidly secured, by means of the bolts 18, suitably shaped cutting blades or jaws 19 and 20, said jaws being provided with relatively sharp cutting edges at the sides, and relatively sharp points at the lower ends for facilitating the insertion of the device into the ground. The said blades 19 and 20 are of substantially V-shaped cross-section, as shown in the drawing, and the inner faces of said castings 13 and 14 are similarly shaped in order to receive the said blades, which are securely fastened thereto to hold the same in operative position.

A bolt 21, having a head 22 at one end thereof, is adapted to extend through the castings and blades intermediate their ends, said bolt having the nuts 23 and 24 threaded thereon adjacent its free end, said nuts receiving between them the casting 14 and its associated blade 20. The said bolt is of such a length as to permit the desired pivotal movement of the blades 19 and 20 with respect to each other. Obviously, any other suitable means for limiting the movement of said blades relative to each other may be employed; the means shown, however, provide a simple construction which may be readily adjusted by actuating the nuts 23 and 24.

In operation, the blades 19 and 20 are spaced about three-fourths of an inch apart when in their fully extended position, in which position they are adapted to be inserted into the ground. The said blades are inserted in the ground in position to straddle or receive between them the root of the weed whereby the same may be withdrawn without breaking. Because of the relatively narrow, sharp cutting edges provided for said blades, the hole formed in the ground by the insertion of the device will be relatively small and hardly noticeable after the weed has been extracted.

In order to automatically force the weed out from between the blades, after the same has been forced up, I provide the following novel mechanism: Disposed between the blades 19 and 20 is a vertical repelling means or plunger 25, which may be formed of any suitable material such for example as a wire rod or the like, the lower end of which bends on itself, as shown in the drawing, to form the horizontally disposed portion 26. The intermediate portion of the rod 25 extends through a suitable guide means for guiding the same in its vertical movement, said guide means, in the embodiment illustrated, consisting of an annular ring member 27 loosely mounted on the bolt 21. The other end of said rod 25 is provided with a hooked portion 28 to which is secured one end of a coil spring 29, the other end of which spring is secured to one of the bolts 18 or to some other suitable means provided for that purpose on the casting 14. A second guide means for the rod 25 may be provided adjacent the pivot 17, said means comprising a suitably bent plate 30 held in place by the pivoting means 17 for the castings 13 and 14, said rod being received between the said plate 30 and the ear 15 of the casting 13. It will thus be noted that suitable guide means have been provided for guiding the rod 25 in its vertical movement relative to the blades 19 and 20.

To operate the device the same may be grasped by the handles 10 and 11, said handles being held in position to keep the blades 19 and 20 in their fully extended position, in which position they may be inserted into the ground around the roots of a weed to be extracted or pulled out. It will be noted that upon the insertion of the blades into the ground the plunger 25 will be forced upwardly against the tension of the spring 29, said action being caused by the ground acting against the horizontal portion 26 of the said plunger. After the device has been inserted into the ground the desired amount, the handles 10 and 11 are moved away from each other to cause the blades 19 and 20 to move about their pivot 17 to grasp or clench the weed, and while in this grasping position the device may be pulled out with the weed held between the blades. By again moving the handles 10 and 11 toward each other, the blades 19 and 20 will be extended and the weed automatically forced therefrom by means of the plunger 25 which will be acted upon by the coil spring 29. It will thus be noted that after the weed has been pulled out from the ground the same will be held between the jaws or blades until released into a suitable container by the actuation of the handles 10 and 11.

It will thus be apparent that I have provided a weed-extracting device which may be conveniently operated by a person from a standing position, and which will be effective in pulling up the weeds without breaking the same and also without causing too much of a breaking-up of the ground from which the weeds have been pulled. In addition to that, I have provided improved means for holding the weed in the device after the same has been pulled up from the ground, and for automatically releasing the same by a simple manipulation of the handles of the device thus avoiding the necessity of having to pick the weeds up from the ground after the same have been extracted.

It is believed that my invention, its mode of construction and many of its advantages should be readily understood from the foregoing without further description, and should also be manifest that while a preferred embodiment of the invention has been shown and described for illustrative purposes, the structural details are, nevertheless, capable of wide variation within the purview of my invention as defined in the appended claims.

Having described my invention, what I claim and desire to secure by Letters Patent of the United States is:

1. A device of the character described comprising a pair of pivoted relatively sharp blades adapted to cooperate with each other for gripping a weed or the like, handles connected with said blades for actuating the same, and adjustable means extending through said blades adapted for limiting the opening between the same.

2. A device of the character described, comprising a pair of pivotally mounted cooperating blades, handles attached to said blades for actuating the same, repelling means disposed between said blades adapted for reciprocal movement relative thereto for cleaning the same, said means having a coil spring adapted to be placed under tension upon the insertion of the blades into the ground and to be automatically released upon the withdrawal and opening of the same for forcing the weed from the said blades.

3. A device of the character described, comprising a pair of pivoted jaws adapted for cooperation with each other for gripping a weed or the like when the device is inserted in the ground, handles carried by each of said jaws for actuating the same, repelling means disposed between said jaws and in position for automatically cleaning the same, and means associated with said repelling means for guiding the same in its reciprocal movement relative to said jaws, said repelling means being automatically placed under tension upon the insertion of the blades into the ground, and being held under said tension by the closed blades after the removal of the same from the ground.

4. A device of the character described, comprising a pair of pivoted jaws adapted for cooperation with each other for gripping the weed or the like when the device is inserted in the ground, handles carried by each of said jaws for actuating the same, means for limiting the opening of said jaws, repelling means disposed between said jaws and in position for automatically cleaning the same, said repelling means comprising a vertically movable rod being enlarged at its lower end, spring means for normally holding said repelling means in its lowermost position, said rod being adapted to be moved against the action of the spring when engaged by the ground upon the insertion of the device into the ground, said spring means forcing said rod to its downward position to clean the jaws when the device has been pulled up from the ground and guide means for guiding the said repelling means in its vertical movement.

5. In a device of the character described, pivotally mounted cooperating blades adapted to be inserted into the ground around the weed to be extracted, handle means for actuating said blades, an ejector operating between the said blades, spring means associated with said ejector, said spring means being adapted to be placed under tension upon the insertion of the blades into the ground and to be held in such position until the removal of the blades from the ground and the opening of the same.

In witness whereof, I affix my signature.

ANDREW GEIBEL.